Figure 1:
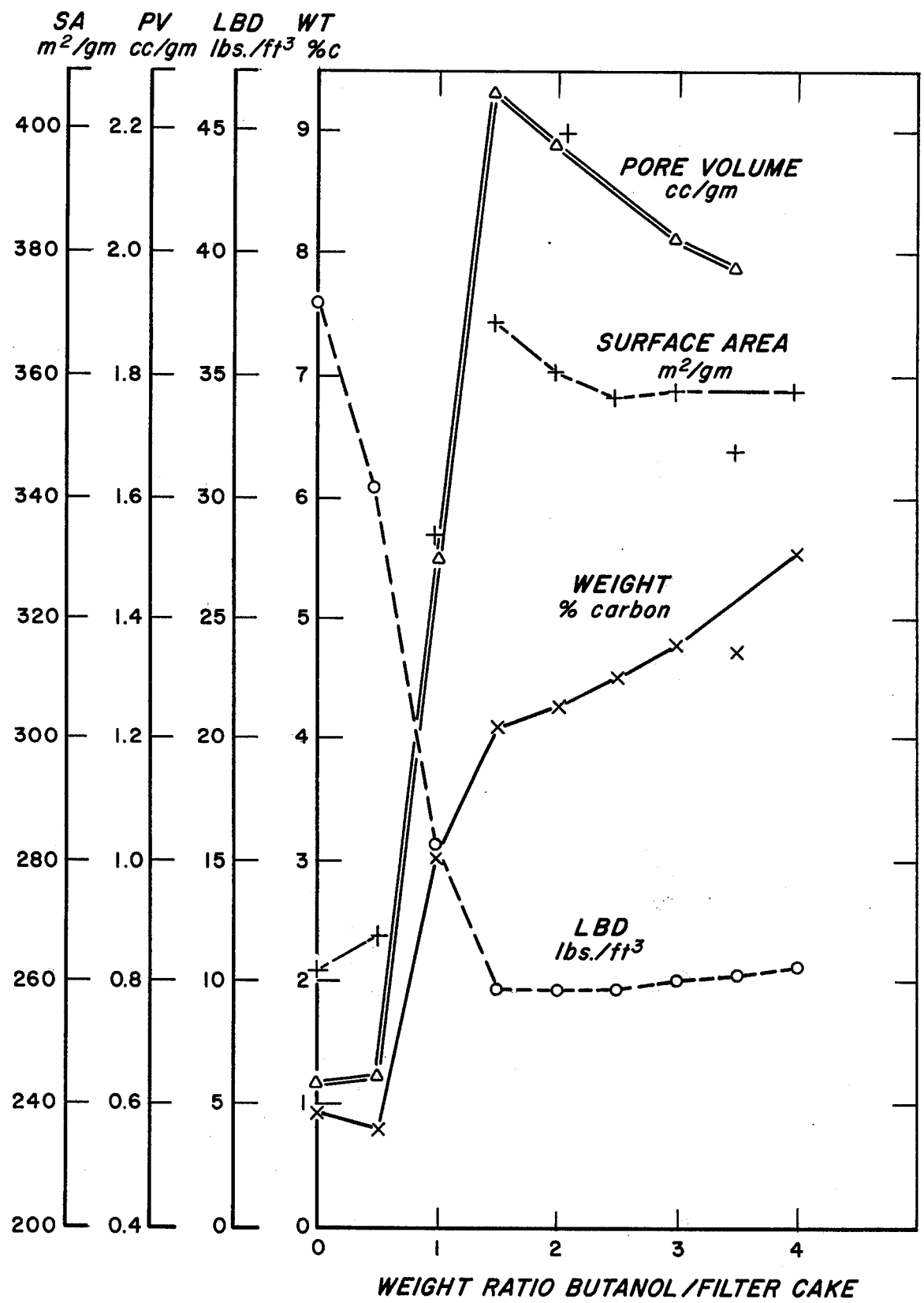

United States Patent [19]

Ziegenhain

[11] 4,024,231
[45] May 17, 1977

[54] PRODUCING ALUMINA HAVING A MAJORITY OF PORE DIAMETERS OF 35-80A

[75] Inventor: William C. Ziegenhain, Ponca City, Okla.

[73] Assignee: Continental Oil Company, Ponca City, Okla.

[22] Filed: Sept. 5, 1974

[21] Appl. No.: 503,219

Related U.S. Application Data

[63] Continuation-in-part of Ser. No. 279,608, Aug. 10, 1972, abandoned.

[52] U.S. Cl. ............................... 423/628; 423/630
[51] Int. Cl.² ........................................ C01F 7/02
[58] Field of Search ............... 423/625, 628, 630; 260/448 AD

[56] References Cited

UNITED STATES PATENTS

| | | | |
|---|---|---|---|
| 2,805,920 | 9/1957 | Richardson | 423/630 |
| 3,055,737 | 9/1962 | Wilson et al. | 423/630 |
| 3,264,061 | 8/1966 | Kehl | 423/628 |
| 3,264,063 | 8/1966 | Carter | 423/630 |
| 3,352,636 | 11/1967 | Wilson et al. | 423/630 |
| 3,394,990 | 7/1968 | Weingaertner et al. | 423/625 |
| 3,417,030 | 12/1968 | O'Hara | 423/628 |
| 3,419,352 | 12/1968 | Acciarri | 423/630 |
| 3,520,654 | 7/1970 | Carr et al. | 423/628 |
| 3,647,374 | 3/1972 | Nomura et al. | 423/630 |
| 3,773,691 | 11/1973 | Leach | 423/628 |

FOREIGN PATENTS OR APPLICATIONS

| | | | |
|---|---|---|---|
| 2,256,012 | 6/1973 | Germany | 423/625 |
| 1,947,177 | 4/1971 | Germany | 260/448 AD |
| 1,903,066 | 9/1970 | Germany | 423/630 |
| 874,585 | 8/1961 | United Kingdom | 260/448 AD |

*Primary Examiner*—G. O. Peters
*Assistant Examiner*—Brian E. Hearn
*Attorney, Agent, or Firm*—Cortlan R. Schupbach, Jr.

[57] ABSTRACT

Alumina having a surface area from about 250 to about 500 m²/g, a loose bulk density from about 10 to about 30 lbs/ft³, a pore volume (0–10,000 A) from about 0.6 to about 2.5 cc/g and a pore volume (0–1,000 A) of at least 0.6 cc/g wherein 70 to 95 percent of said pore volume (0–1,000 A) consists of pores having a diameter in the range of 35 to 80 A and a method for producing such alumina by the water hydrolysis of aluminum methoxide.

6 Claims, 2 Drawing Figures

PRODUCING ALUMINA HAVING A MAJORITY OF PORE DIAMETERS OF 35-80A

This application is a continuation-in-part of our earlier filed application, U.S. Ser. No. 279,608, entitled "Novel Alumina and Process Therefor," filed Aug. 10, 1974, by William C. Ziegenhain, now abandoned.

This invention relates to low density, high porosity, high surface area alumina. This invention also relates to low density, high porosity, high surface area alumina having a very desirable pore volume distribution. This invention further relates to a method for the production of such alumina. This invention also relates to a method for producing such alumina by the water hydrolysis of aluminum methoxide.

Numerous processes have been used heretofore in the production of alumina. Alumina has been produced by the water hydrolysis of aluminum alkoxide, the alum process, the sodium aluminate process, and numerous variations thereof. Alumina has a variety of uses, such as for catalysts, catalyst supports, and the like. In many of these applications, the usefulness of the alumina is directly related to its pore volume, surface area, and density. Generally, lighter alumina having low bulk density, high surface area, and high porosity is more desirable. Many of the processes known heretofore produce alumina having a loose bulk density greater than about 35 lbs/ft$^3$, a pore volume of less than about 1.0 cc/g, and surface areas lower than about 275 m$^2$/g. Some processes have produced lighter alumina having a higher pore volume, but a large portion of such pore volume is often in the form of macropores having a pore diameter greater than 1,000 A and is of little value for catalytic uses. A desirable alumina product having a high surface area, a high pore volume, and a low bulk density has been produced by process shown in U.S. Ser. No. 246,028, entitled "High Porosity, High Surface Area, Low Bulk Density Alumina," filed Apr. 20, 1972, by William C. Ziegenhain. While the alumina produced by the process shown in U.S. Ser. No. 246,028 has many desirable properties, it is desirable in some instances to produce alumina having such desirable properties and a relatively narrow pore volume distribution. Accordingly, much time and effort have been devoted to the development of a method whereby alumina having a narrow pore volume distribution could be produced.

It has now been found that alumina having a surface area from about 250 to about 500 m$^2$/g, a loose bulk density from about 10 to about 30 lbs/ft$^3$, a pore volume (0–10,000 A) from about 0.6 to about 2.5 cc/g and a pore volume (0–1,000 A) of at least 0.6 cc/g wherein 70 to 95 percent of said pore volume (0–1,000 A) consists of pores having a diameter in the range of 35 to 80 A is produced by a process comprising (a) reacting aluminum alkoxides wherein the alkoxy groups contain an average of from 4 to 20 carbon atoms each with a stoichiometric excess of methanol to form aluminum methoxide and alcohol containing from 4 to 20 carbon atoms; (b) separating the aluminum methoxide and the alcohol; (c) reacting the aluminum methoxide with a stoichiometric excess of water to form alumina and methanol; (d) separating the alumina containing a minor portion of the methanol and water from a major portion of the methanol and water; (e) mixing the alumina with an organic solvent selected from the group consisting of aliphatic alcohols containing from 2 to 4 carbon atoms in an amount sufficient to produce alumina having the desired properties upon drying; and (f) drying to produce alumina.

Figure 2:
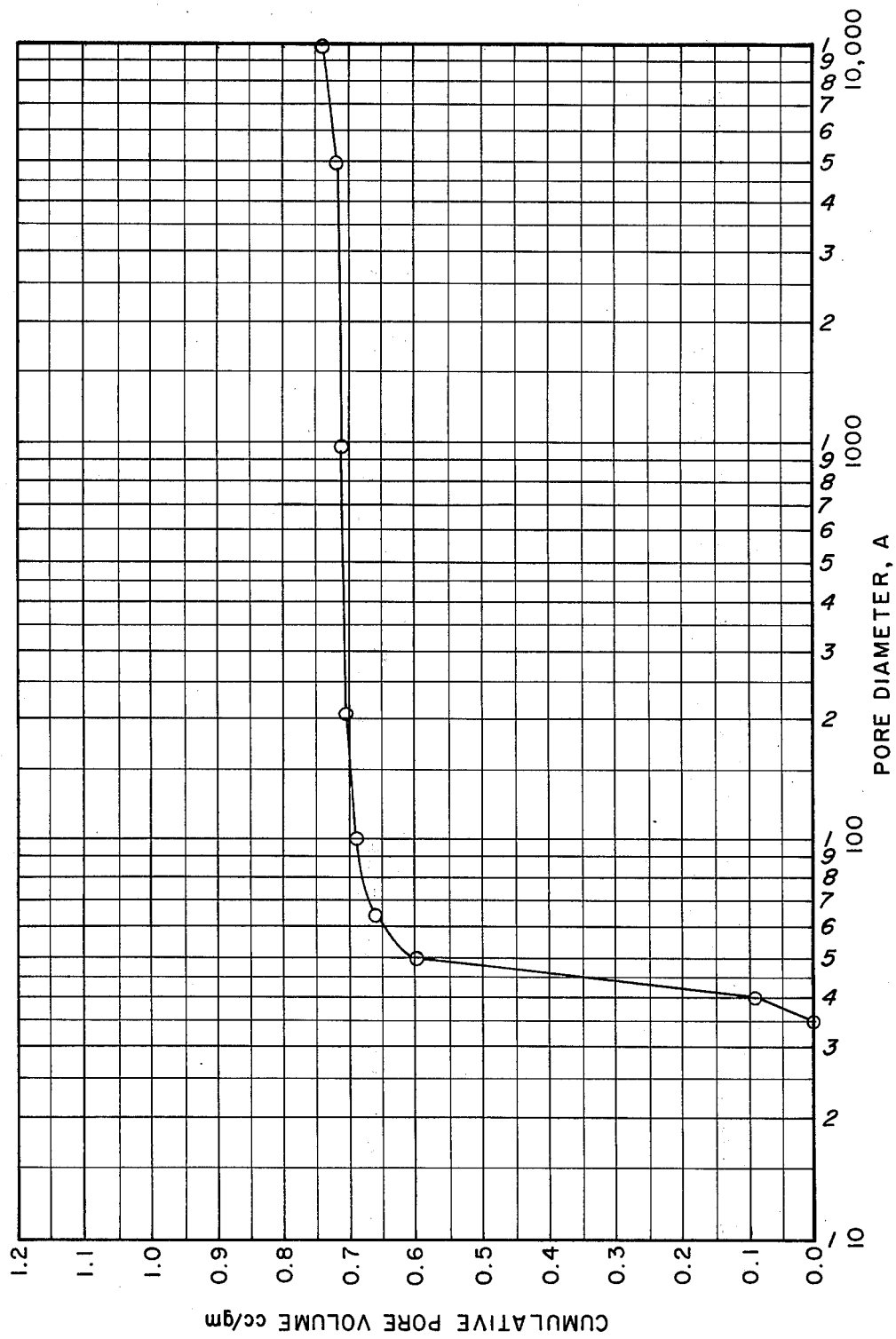

FIG. 1 is a graph showing the variation in alumina properties as the ratio of butanol to alumina filter cake is varied; and FIG. 2 is a graph showing the pore volume distribution of the alumina produced in the example.

Aluminum alkoxides suitable for use in the method of the present invention are those aluminum alkoxides wherein the alkoxy groups contain an average of from 4 to 20 carbon atoms each. Suitable aluminum alkoxides are produced by processes such as the Ziegler process, the reaction of metallic aluminum with anhydrous alcohols and the like. The preparation of such aluminum alkoxides is well known to those skilled in the art and need not be discussed further. In many instances, the aluminum alkoxides are produced for the purpose of producing alumina or alcohols. In any event, it is desirable that the alcohols be recovered as such since they constitute a valuable by-product of the reaction. Some suitable alkoxide mixtures, such as those produced by the Ziegler process, may contain minor amounts of alkoxy groups containing less than 4 carbon atoms. As is well known, however, alcohols produced by the Ziegler process will contain only alkoxy groups having an even number of carbon atoms.

Such aluminum alkoxides are contacted with a stoichiometric excess of methanol to form aluminum methoxide and alcohols containing 4 to 20 carbon atoms. As is well known, the aluminum methoxide is a solid and precipitates, thereby facilitating recovery. The alcohols are readily separated by decanting and the like. In some instances, it may be desirable to use an organic diluent so that the recovered alcohols are more readily separated from the precipitated aluminum methoxide.

The reaction of aluminum alkoxide with the methanol is best carried out using anhydrous or substantially anhydrous methanol. The reaction proceeds at room temperature, although it is desirable that higher temperatures be used in order that the reaction may proceed more rapidly to completion. It is also desirable that an excess, for instance, up to twice the stoichiometric amount, of methanol be used. In a preferred embodiment, the reaction mixture, comprising aluminum alkoxides and methanol, is heated to a reflux temperature for an effective period of time to achieve substantially complete reaction. Obviously, the reaction time will vary depending upon the particular alkoxide groups present and the like. Quite obviously, many variations in the method of achieving reaction of the methanol with the aluminum alkoxide are possible. Such variations and modifications are well known to those skilled in the art and need not be discussed further. Upon completion of the reaction, the aluminum methoxide is a precipitate which is readily recovered by filtration, decantation, and the like from the alcohols. The recovered aluminum methoxide is then optionally washed with a suitable solvent, such as aliphatic, organic alcohols containing from 1 to 4 carbon atoms, to remove residual amounts of the heavier alcohols produced by the reaction of the methanol with the aluminum alkoxide. The aluminum methoxide is then mixed with at least a stoichiometric amount of water to form aqueous alumina and methanol. Desirably, a considerable excess of water is present in the hydrolysis reaction to insure substantially complete reaction of the aluminum methoxide. The alumina containing a minor portion of the methanol and water is then separated from the major portion of the water and methanol. The separated alumina is then mixed with an organic solvent selected from the group consisting of methanol, ethanol, propanol, isopropanol, butanol, isobutanol, and tertiary butanol in an amount sufficient to produce alumina having the desired properties upon drying. The resulting solvent-aqueous alumina mixture is then dried to produce the alumina.

Alumina as used herein refers to an apparently dry solid material which in addition to $Al_2O_3$ may contain water of hydration, free water, and the like. The $Al_2O_3$ content of such alumina will be shown hereinafter as the weight percent $Al_2O_3$.

The aqueous alumina slurry used at step (e) desirably contains no more than about 32 weight percent $Al_2O_3$. The aqueous alumina slurry can be concentrated by drying and the like to about 32 weight percent $Al_2O_3$ prior to mixing with the organic solvent without substantial losses in product quality. It is preferred that the aqueous alumina slurry contain from about 10 to about 20 weight percent $Al_2O_3$.

In a preferred embodiment of the present invention, the aqueous alumina mixed with the organic solvent is produced by filtering to produce an aqueous alumina filter cake containing about 10 to 20 weight percent $Al_2O_3$.

The amount of solvent mixed with the aqueous alumina is that amount which is sufficient to produce the desired alumina properties upon drying. Desirably, the solvent is added in an amount sufficient to form an azeotropic mixture of the solvent and the water present in the aqueous alumina so that water is removed by azeotropic evaporation during drying. Lesser amounts of solvent are effective to achieve improvements in alumina properties, but it has been observed that more desirable results are obtained when an azeotropic amount is used. It has been found that very desirable results are obtained when up to about 20 percent excess solvent is used. References to proportions of solvent to water, solvent to alumina filter cake, etc. as used herein are by weight unless otherwise stated. For purposes of calculating the water present, the alumina is treated as $Al_2O_3$; thus, the water of hydration is treated as removable water even though such water is not usually removed in the early drying operations, i.e., usually an alumina hydrate, such as alpha alumina monohydrate, is the product from the first drying step, although such alumina may be further dried or calcined to produce gamma alumina and the like. It is, of course, necessary to have the azeotropic mixture described above only in the mixture of step (e), i.e., earlier washings of the aluminum methoxide, the aqueous alumina, and the like may be at any desired ratio. Preferred solvents are ethanol, propanol, isopropanol, butanol, isobutanol, and tertiary butanol. The listed solvents all yield desirable products, but based primarily on economics and availability, ethanol and butanol are preferred. Azeotropic mixtures of the suitable solvents are shown in Lange's *Handbook of Chemistry*, 9th edition, at pages 1484–1485. It has been found that when butanol is used, very desirable results are obtained when a 1.5 to 1 weight ratio of butanol to alumina filter cake containing about 10 to 20 weight percent $Al_2O_3$ is used in the drying step. The other solvents listed are not optimized, but by the use of the azeotropic mixtures, those skilled in the art will find no difficulty in determining an appropriate amount of solvent for mixture with the aqueous alumina. FIG. 1 shows the effect upon alumina properties as the ratio of butanol to alumina filter cake is varied. The aqueous alumina slurry was produced by the water hydrolysis of aluminum alkoxides produced by the Ziegler process, followed by purification of the aqueous alumina phase to remove residual amounts of alcohols and filtration of the aqueous alumina phase to produce an aqueous alumina filter cake which contained about 16 weight percent $Al_2O_3$. The aqueous alumina filter cake was then mixed with varying amounts of butanol and dried.

The use of greater amounts of the solvent does not defeat the objectives of the present invention, but it has been observed that with all solvents listed upon increasing the solvent-water ratio substantially, greater amounts of residual organic material remain on the alumina product. It thus appears that the use of greater solvent ratios is detrimental in some respects with no offsetting advantages. The alumina produced by the method of the present invention typically has a surface area of about 250 to about 500 $m^2/g$, a loose bulk density from about 10 to about 30 $lbs/ft^3$, a pore volume (0–10,000 A) from about 0.6 to about 2.5 cc/g, and a pore volume (0–1,000 A) of at least 0.6 cc/g wherein 70 to 95 percent of the pore volume (0–1,000 A) consists of pores having a diameter in the range of 35 to 80 A. In many instances, the alumina pore volume (0–1,000 A) varies from about 0.6 to about 1.5 cc/g. It has also been observed that in many instances, from 70 to 90 percent of the pore volume (0–1,000 A) consists of pores having a diameter in the range of 35 to 50 A. Such alumina is very desirable in catalyst formation and the like, since in most catalyst processing steps the pore volume below 500 A is not significantly affected by extrusion, pelletizing, and the like in the production of cataylst materials.

Desirable alumina properties may also be achieved by the use of ethanol to form an aluminum ethoxide, which is a solid and precipitates from the reaction mixture. It has been found, however, that the separation is somewhat more difficult, the reaction is somewhat slower, and the like. Accordingly, the use of methanol to form the aluminum methoxide is preferred.

The foregoing description of preferred embodiments is illustrative rather than limiting, and many variations and modifications are possible within the scope of the present invention. Such variations and modifications may be considered obvious and desirable by those skilled in the art upon a review of the foregoing description of preferred embodiments and the following example.

EXAMPLE 50 grams of aluminum alkoxides produced by the Ziegler process were added to a 5-liter, 3-necked flask. 1,000 grams of absolute methanol was added to the flask, and the mixture was heated to boiling at about 63° C, refluxed for 30 minutes, and then filtered. The aluminum methoxide precipitate was then separated, mixed with 1,000 grams of fresh methanol, refluxed for an additional 30 minutes, and then filtered. 440 grams of precipitate was recovered. About 297 grams of the precipitate was added to a 5-liter flask and mixed with 600 grams of methanol and 200 grams of distilled water. The mixture was refluxed for about 20 minutes and then filtered. The alumina precipitate was washed with 600 grams of methanol and dried overnight at about 250° F. The alumina so produced had a loose bulk density of 32.8 lbs/ft³. After calcining for 3 hours at 900° F, the alumina had a loose bulk density of 25.7 lbs/ft³, a surface area of 420.3 m²/g, a pore volume (0–10,000 A) of about 0.74 cc/g. By reference to FIG. 2, it is shown that about 95 percent of the pore volume up to 1,000 A was in the range of 35 to 80 A, and about 85 percent of the pore volume up to 1,000 A was in the range of 35 to 50 A.

The pore volumes shown in the previous example were determined by the mercury penetration technique using pressures up to about 50,000 psig. The tests were performed on a mercury porosimeter, Model 905-1, manufactured by the Micromeritics Corporation of Norcross, Georgia.

Having thus described the invention, I claim:

1. In a method for producing alumina having the properties: a surface area from about 250 to about 500 m²/g, a loose bulk density from about 10 to about 30 lb/ft³, a pore volume of 0–10,000 A from about 0.6 to about 2.5 cc/g and a pore volume from 0–1,000 A of at least 0.6 cc/g, said method consisting essentially of:
   a. hydrolyzing aluminum alkoxides, wherein the alkoxy groups contain an average of from 4 to 20 carbon atoms each, with water to produce an aqueous alumina slurry and alcohols containing from 4 to 20 carbon atoms;
   b. separating said aqueous alumina slurry from said alcohols;
   c. mixing said aqueous alumina slurry with an organic solvent selected from the group consisting of methanol, ethanol, propanol, isopropanol, butanol, isobutanol, and tertiary butanol in an amount sufficient to produce said alumina having said properties upon drying; and,
   d. drying to produce alumina having said properties, the improvement comprising:
   e. reacting said aluminum alkoxides of (a) wherein the alkoxy groups contain from 4 to 20 carbon atoms each, with a stoichiometric excess of methanol to form aluminum methoxide and alcohols containing from 4 to 20 carbon atoms;
   f. separating said aluminum methoxide and said alcohols;
   g. reacting said aluminum methoxide with a stoichiometric excess of water to form alumina and methanol;
   h. separating said alumina containing a minor portion of said methanol and water from a major portion of said methanol and water;

and thereafter mixing as in step (c) and drying as in step (d) to produce an improved alumina having said properties and a pore volume distribution wherein 70 to 95 percent of said pore volume from 0–1,000 A consists of pores having a diameter in the range of 35–80 A.

2. The improvement of claim 1 wherein said improved alumina has a pore volume of 0–1,000 A from about 0.6 to about 1.5 cc/g.

3. The improvement of claim 1 wherein from 70 to 90 percent of said pore volume from 0–1,000 A consists of pores having a diameter in the range of 35 to 50 A.

4. The improvment of claim 1 wherein said methanol of step (e) is present in at least twice the stoichiometric amount required for reaction with said aluminum alkoxides.

5. The improvement of claim 1 wherein said reaction of (e) is at a temperature up to the reflux temperature of the reaction mixture.

6. The improvement of claim 1 wherein said methanol of (e) is substantially anhydrous.

* * * * *